United States Patent [19]

Wilson

[11] 3,957,738

[45] May 18, 1976

[54] VULCANIZABLE ELASTOMER OF BROMINATED BUTYL WITH ELEMENTAL SULFUR

[75] Inventor: Geoffrey John Wilson, Sarnia, Canada

[73] Assignee: Polymer Corporation Limited, Sarnia, Canada

[22] Filed: Sept. 27, 1974

[21] Appl. No.: 509,912

Related U.S. Application Data

[63] Continuation of Ser. No. 219,500, Jan. 20, 1972, abandoned.

[30] Foreign Application Priority Data

Feb. 11, 1971 Canada.................................. 105073

[52] U.S. Cl........................... 260/79.5 C; 260/42.35
[51] Int. Cl.²....................... C08D 3/14; C08D 9/00

[58] Field of Search.................. 260/79.5 A, 79.5 C, 260/85.3 C, 775, 776

[56] References Cited
FOREIGN PATENTS OR APPLICATIONS
619,526  5/1961  Canada.......................... 260/85.3 H

*Primary Examiner*—Christopher A. Henderson, Jr.
*Attorney, Agent, or Firm*—Stevens, Davis, Miller & Mosher

[57] ABSTRACT

Brominated butyl rubber can be vulcanized by heating it at 120° – 200°C for 5 minutes – 2 hours with elemental sulfur in the absence of the usual activators and accelerators. Chlorinated butyl rubber does not vulcanize under the same conditions.

5 Claims, No Drawings

VULCANIZABLE ELASTOMER OF BROMINATED BUTYL WITH ELEMENTAL SULFUR

This is a continuation of application Ser. No. 219,500, filed Jan. 20, 1972, now abandoned.

This invention relates to the preparation of a vulcanizable mixture of an elastomer and a vulcanizing agent, in particular, it is concerned with a vulcanizable composition wherein the elastomer is a halogen-containing butyl rubber.

In this specification, by the term "butyl rubber" is meant a rubbery copolymer of an isoolefin with a minor amount of copolymerizable multiolefin, usually a conjugated diolefin, for example, a copolymer of isobutylene with isoprene. Halogenated butyl rubber is known and may be prepared by treating a solution of butyl rubber in an inert organic solvent with a halogen such as chlorine or bromine and recovering the halogenated butyl rubber.

It is known to vulcanize these chlorinated or brominated butyl rubbers with vulcanization systems which are free of elemental sulfur, for example with amines and metal oxides, or with systems which contain elemental sulfur in a minor proportion combined with a major proportion of a vulcanizing agent such as a metal oxide, e.g. zinc oxide or magnesium oxide.

In accordance with this invention, it has now been found that while chlorobutyl rubber does not respond to attempts to vulcanize it with elemental sulfur as the sole vulcanizing agent, bromobutyl rubber surprisingly is vulcanizable to a high state of cure by this means.

Thus, this invention provides a process for vulcanizing brominated butyl rubber comprising the steps of mixing said brominated butyl rubber with a vulcanization system consisting of about 0.1 to 5 parts by weight of elemental sulfur per 100 parts by weight of said rubber, shaping the mixture and heating the shaped mixture to vulcanize it.

In the vulcanization system of this invention, elemental sulfur is employed as the sole component of the vulcanization system, and the known organic and inorganic vulcanization adjuvants such as activators and accelerators are not used.

As previously stated, the halogenated butyl rubber is prepared by halogenating a rubbery copolymer of an isoolefin with a minor amount of multiolefin, preferably a conjugated diolefin. The isoolefin may be a $C_4$ to $C_7$ isoolefinic hydrocarbon, for example isobutylene, 2-methyl-1-butene, and 2-methyl-1-pentene, of which isobutylene is especially preferred. The conjugated diolefin is an acyclic $C_4$-$C_{10}$ hydrocarbon, for example butadiene-1,3, isoprene, 2-methyl-hexadiene-1,3 of which isoprene is especially preferred. In the halogenated butyl rubber used in this invention the conjugated diolefin forms about 0.5 to 5 mole % of the copolymer, particularly 0.5 to 3 mole %; the halogen must be bromine and the amount of bromine usually is about 1 atom of bromine per carbon-to-carbon double bond but may vary up to 3 atoms of bromine per carbon-to-carbon double bond. Considered on a weight basis the bromine content normally will be in the range of about 0.5–13 weight % and particularly 0.5–7 weight %.

The elemental sulfur which is used as the sole component of the vulcanization system may be in any of the particle sizes and forms known to rubber compounders as an ingredient in conventional rubber vulcanizing systems. While the amount of sulfur required to be used may readily be determined for any particular set of conditions the amount normally will be within the range of about 0.1 to 5 parts by weight per 100 parts by weight of copolymer frequently an amount in the range of about 0.3 to 2 parts in more suitable. Higher amounts may be used but with the risk of "blooming" of sulfur onto the surface of the vulcanizate.

The brominated butyl rubber and sulfur may be blended to form a vulcanizable mixture by any of the various conventional means for compounding rubber such as kneading on rubber mills or in an internal mixer.

Various other materials may optionally be included in the vulcanizable mixture such as fillers, plasticizers, stabilizers, etc. as are commonly employed in rubber compounding. One of the problems frequently encountered during compounding of rubbers is "scorch" i.e. premature onset of vulcanization. An added advantage of the present invention is resistance to scorch.

After compounding, the mixture is shaped and vulcanized by heating it to a temperature within the range of 120° to 200°C, preferably from about 140° to 180°C for a period of several minutes e.g. 5 minutes to an hour or more but preferably not more than 2 hours, it being understood of course that the longer cure times are to be used at the lower cure temperatures.

A variety of vulcanized products may be prepared according to the present method including inner liners for tubeless tires, mechanical goods and pharmaceutical goods.

The following Examples are given by way of illustration in which "parts" are parts by weight unless otherwise stated.

EXAMPLES

The bromobutyl rubber employed was a rubbery copolymer of isobutylene and isoprene. It had a bromine content of 2.1 wt. % and a Mooney viscosity (ML-12 125°C) of 42.

The chlorobutyl employed was a rubbery copolymer of isobutylene and isoprene. It had a chlorine content of 1.1 wt. % and a Mooney viscosity (ML-12' 125°C) of 50.

The elemental sulfur employed was conventional U.S. National Bureau of Standards grade of rubber compounding sulfur.

Bromobutyl rubber compositions were compounded on a two roll rubber mill according to the formulation:

| | |
|---|---|
| Polymer | 100 parts |
| Semi-reinforcing carbon black | 50 |
| Sulfur | Variable (as shown in Table I) |

Portions of the unvulcanized bromobutyl rubber compounds were individually tested at 153°C in a Monsanto Rheometer (ASTM Method D2705-68T). From the resulting rheograms, the data as to torque vs. time is shown in Table I.

The Mooney scorch time was measured on other portions of the compounds at 125°C according to ASTM Method D1646-68 and the results are recorded in Table I as are the stress-strain data obtained by applying ASTM Method D412-68 to vulcanized sheets of the compounds cured at 153°C for 45 minutes.

Comparative control compositions were also prepared in which the rubber employed was the above-described chlorobutyl rubber and in which the sulfur level was 0.3, 0.5 and 1.0 part respectively. Rheometer tests as described above were carried out at 153°C and additionally, in the case of the composition containing 0.3 part sulfur, rheometer testing was also carried out at 165°C and 175°C.

A reference control was likewise prepared employing 100 parts bromobutyl rubber, 50 parts semi-reinforcing black and 5 parts zinc oxide, vulcanized and tested under the same conditions to provide data employing a conventional sulfur-free vulcanization system. These test data are also given in Table I.

three atoms of bromine per carbon-to-carbon double bond, comprising the steps of mixing said brominated butyl rubber with a vulcanization system consisting of 0.1 to 5 parts of elemental sulphur as the sole vulcanizing agent per 100 parts by weight of said rubber, and heating the mixture to vulcanize it.

2. A process according to claim 1 wherein the brominated butyl rubber contains 0.5 to 13 weight percent bromine.

3. A process according to claim 2 wherein the mixture is vulcanized by heating it at 120°C. to 200°C. for

TABLE I

| Monsanto Rheometer | Experimental Bromobutyl Compositions at sulfur levels of: | | | | | Comparative Chlorobutyl Compositions | Reference Bromobutyl ZnO Control Composition |
|---|---|---|---|---|---|---|---|
| | 0.1 | 0.3 | 0.5 | 1 | 2 | | |
| Torque Reading (inch-pounds) | | | | | | | |
| (a) Minimum Reading (time) | 5 (5) | 5 (3) | 5.5 (3.5) | 6 (3) | 5 (2.5) | no significant increase in torque for any of the compositions prepared | 5 (5 mins) |
| (b) Reading at 5 minutes | 5 | 5 | 5.5 | 6.5 | 7.5 | | 5 |
| 10 minutes | 5.5 | 7.5 | 17.5 | 24 | 30 | | 6 |
| 20 minutes | 9 | 25 | 35 | 37.5 | 40.5 | | 13.5 |
| 30 minutes | 12.5 | 31 | 37.5 | 39 | 42.5 | | 30 |
| 60 minutes | 20 | 32.5 | 37.5 | 38.5 | 41 | | 30 |
| Mooney Scorch, time for 5 points rise (minutes) | not tested | >25 | >25 | 20 | 14½ | not tested | >25 |
| Vulcanizate: | | | | | | | |
| Tensile, kg/cm² | not tested | 141 | 146 | 143 | 145 | did not vulcanize | 135 |
| Elongation, % | | 590 | 615 | 575 | 625 | | 480 |
| Modulus at 300%, kg/cm² | | 56 | 60 | 68 | 65 | | 70 |

This example shows that while chlorobutyl rubber did not respond to vulcanization with sulfur being the sole vulcanization component the performance of bromobutyl rubber with sulfur was surprisingly positive, with the results obtained comparing favorably with those obtained with a sulfur-free ZnO cure system.

What is claimed is:

1. A process for vulcanizing brominated butyl rubber, wherein the butyl rubber is a copolymer of isobutylene and isoprene in which the copolymerized isoprene forms from 0.5 to 3.0 mole percent of the copolymer and which has been brominated with up to 5 minutes to 2 hours.

4. A process according to claim 2 wherein the mixture is vulcanized by heating it at 140°C. to 180°C. for 5 minutes to 2 hours.

5. A process according to claim 4 wherein the brominated butyl rubber contains 0.5 – 7 weight percent bromine, the amount of sulphur used is 0.3 – 2 parts per 100 parts by weight of said rubber and the mixture is vulcanized by heating it at 140°C. to 180°C. for 5 minutes to 2 hours.

* * * * *